(12) United States Patent
Smolyaninov et al.

(10) Patent No.: US 11,818,590 B2
(45) Date of Patent: Nov. 14, 2023

(54) APPARATUS, METHODS AND SYSTEMS FOR IMPROVING COVERAGE OF FIFTH GENERATION (5G) COMMUNICATION NETWORKS

(71) Applicant: Saltenna LLC, McLean, VA (US)

(72) Inventors: Igor Smolyaninov, Columbia, MD (US); Quirino Balzano, Annapolis, MD (US)

(73) Assignee: Saltenna LLC, McLean, VA (US)

( * ) Notice: Subject to any disclaimer, the term of this patent is extended or adjusted under 35 U.S.C. 154(b) by 273 days.

(21) Appl. No.: 17/233,142

(22) Filed: Apr. 16, 2021

(65) Prior Publication Data

US 2021/0328353 A1    Oct. 21, 2021

Related U.S. Application Data

(60) Provisional application No. 63/010,964, filed on Apr. 16, 2020.

(51) Int. Cl.
*H04W 16/26* (2009.01)

(52) U.S. Cl.
CPC .................................. *H04W 16/26* (2013.01)

(58) Field of Classification Search
CPC ..... H04W 16/26; H04W 16/28; H04W 88/08; H04W 88/085; H04W 92/20; H04W 40/22; H04W 4/80; H04W 84/18; H04W 4/025; H04W 24/00; H04W 4/38; H04W 4/021; H04W 52/0209; H01Q 19/108; H01Q 11/08; H01Q 1/38; H01Q 1/2283; H01Q 1/42; H01Q 19/00; H01Q 21/0087; H01Q 23/00; H01Q 5/40; H01Q 9/0457; H01P 7/10; H01L 2223/6677; H01L 23/552; H01L 2924/181; H01L 21/76829; H01L 23/522; H01L 29/0649; G01F 23/284; G01F 23/22; G01F 1/662; H04B 13/00; B06B 1/0622

See application file for complete search history.

(56) References Cited

U.S. PATENT DOCUMENTS

| 4,008,469 A | 2/1977 | Chapman |
| 5,841,288 A | 11/1998 | Meaney et al. |

(Continued)

OTHER PUBLICATIONS

Akinci et al. "Tuning the group velocity of light for 1D photonic crystal with defect", IARJSET 3, 2016, p. 155-157.

(Continued)

*Primary Examiner* — Lana N Le
(74) *Attorney, Agent, or Firm* — Maier & Maier, PLLC

(57) ABSTRACT

In some embodiments, a system includes a first antenna element configured, in response to receiving fifth generation (5G) communication signals carrying encoded data, to generate a first surface electromagnetic wave. The first surface electromagnetic wave is capable of tunneling through a conductive enclosure and includes the encoded data. The system includes a second antenna element, within the conductive enclosure configured, in response to receiving the first surface electromagnetic wave, to generate a second surface electromagnetic wave within the conductive enclosure for distributing the encoded data to an electronic device operating in the conductive enclosure.

20 Claims, 11 Drawing Sheets

(56) References Cited

U.S. PATENT DOCUMENTS

| | | | |
|---|---|---|---|
| 6,218,993 B1* | 4/2001 | Chao | H01Q 11/08 343/702 |
| 10,051,488 B1* | 8/2018 | Vannucci | H04W 16/28 |
| 10,698,079 B2* | 6/2020 | Kushnir | H01Q 3/36 |
| 10,805,013 B2* | 10/2020 | Smolyaninov | H04B 7/0617 |
| 11,121,896 B1* | 9/2021 | Bendlin | H04L 27/22 |
| 2003/0001793 A1* | 1/2003 | Park | H01Q 11/08 343/702 |
| 2003/0135326 A1 | 7/2003 | Brown | |
| 2004/0201531 A1* | 10/2004 | Fujimura | H01Q 1/42 343/895 |
| 2007/0146219 A1 | 6/2007 | Rhodes et al. | |
| 2016/0015993 A1 | 1/2016 | Turner et al. | |
| 2016/0171790 A1 | 1/2016 | Abraham et al. | |
| 2017/0030853 A1* | 2/2017 | Hodges, Jr. | G06Q 10/06 |
| 2018/0198536 A1 | 7/2018 | Smolyaninov | |
| 2019/0150072 A1* | 5/2019 | Barzegar | H04W 92/20 370/338 |

OTHER PUBLICATIONS

Alu et al. "Epsilon-near-zero metamaterials and electromagnetic sources: Tailoring the radiation phase pattern", Physical Review, B 75, 2007, 155410.

Applin et al. "Ultraviolet spectral reflectance of carbonaceous materials", Icarus, vol. 307, 2018, p. 40-82.

Auty, R. H. Cole, "Dielectric properties of ice and solid $D_2O$", Journal of Chemical Physics, vol. 20, No. 8, 1952, p. 1309-1314.

Balzano Q. et al. "The Near Field of Dipole Antennas", Part 1—Theory, IEEE Transactions on Vehicular Technology, vol. VT-30, No. 4, 1981, p. 161-174.

Balzano Q. et al. "Field and temperature gradients from short conductors in a dissipative medium," International Journal of Antennas and Propagation, vol. 2007, Article ID 57670 (9 pages).

Balzano Q. et al. "The near field of helical antennas," IEEE Trans. on Vehicular Technology, vol. 31, No. 4, 1982, p. 173-185.

Bethe, H. A., Theory of diffraction by small holes, the Physical Review, vol. 66, No. 7 and 8, 1944, p. 163-182.

Cheng, D. K., Fundamentals of Engineering Electromagnetics, Chapter 8, London, Pearson, 1992, 53 pages.

Ditkin and A.P. Prudnikov, "Integral Transforms and Operational Calculus", Pergamon Press, First Edition, 1965, p. 400-412 (eq. 9,302.).

Drude P., "Zur elektronentheorie der metalle," Annalen der Physik, vol. 306, 566-613, 1900, with machine translation, 96 pages.

Ebbesen, T. W. et al. "Extraordinary optical transmission through sub-wavelength hole arrays," Nature, vol. 391, 1998, p. 667-669.

Elliott J. et al. "Polarization control of optical transmission of a periodic array of elliptical holes in a metal film," Optics Letters, vol. 29, 2004, p. 1414-1416.

Giordano et al. "Phase-resolved terahertz self-detection near-field microscopy," Optic Express, vol. 26, No. 14, 2018, 18423-18435.

Harrington, "Time-Harmonic Electromagnetic Fields", Mc-Graw-Hill Book Company, 1961, N.Y., N.Y. Chapter 5, p. 198-263, p. 331-338.

Jordan et al. "Radiation", Electromagnetic Waves and Radiating Systems, Prentice-Hall, Second Edition, 1968, Chapter 10, p. 311-343.

Lezec, H. J., et al. "Beaming light from a subwavelength aperture," Science, vol. 297, 2002, p. 820-822.

Li, Y. & Oldenburg, D. W., "Aspects of Charge Accumulation in d.c. Resistivity Experiments", Geophysical Prospecting, 39, 1991, p. 803-826.

Lianlin L. et al. "Towards super-resolution microwave imaging: General framework", 10th International Symposium on Antennas, Propagation & EM Theory (ISAPE), 2012, 4 pages.

McLachlan, Bessel Functions for Engineers, second edition, 1961, Oxford University Press, London, U.K. p. 157, 195, 227, 228, eq.6-7, eq. 76-77, 10 pages.

Michalski et al. "The Sommerfeld half-space problem revisited: from radio frequencies and Zenneck waves to visible light and Fano modes" Journal of Electromagnetic Waves and Applications, 30, 2016, p. 1-42.

Midi et al. "Broadband Complex Dielectric Constants of Water and Sodium Chloride Aqueous Solutions with Different DC Conductivities", IEEJ Transactions on Electrical and Electronic Engineering, 9, 2014, S8-S12.

Mitrofanov et al. "Near-field terahertz probes with room-temperature nanodetectors for subwavelength resolution imaging," Science Reports, vol. 7, 2017, 44240, 10 pages.

Muller et al. "Mapping the magnetic susceptibility and electric conductivity of marine surficial sediments by benthic EM profiling", Geophysics, vol. 77, No. 1, 2012, p. 1-14.

Nie et al. "Seabed-Rock-Layer Electromagnetic Communication Channel Model with Low Path Loss Based on Evanescent Wave", Radioengineering, vol. 27, No. 2, 2018, p. 431-439.

Pethig "Interfacial Dielectric Phenomena in Biological Systems", John Wiley & Sons, 1979, Chapter 5, p. 167-168.

Politano et al. "The influence of chemical reactivity of surface defects on ambient-stable InSebased nanodevices," Nanoscale, vol. 8, 2016, p. 8474-8479.

Politano et al. "Optoelectronic devices, plasmonics and photonics with topological insulators," APL Materials, vol. 5, 2017, 035504 (11 pages).

Politano et al. "The role of surface chemical reactivity in the stability of electronic nanodevices based on two-dimensional materials 'beyond graphene' and topological insulators," Flat Chem., vol. 1, 2017, p. 60-64.

Price "ELF electromagnetic waves from lightning: the Schumann Resonances", Atmosphere 7, 2016, 116 (20 pages).

Sanne et al. "Radio frequency transistors and circuits based on CVD MoS2," Nano Letters, vol. 15, 2015, p. 5039-5045.

Schwalenberg et al. "The effect of seafloor topography on magnetotelluric fields: An analytical formulation confirmed with numerical results", Geophys. J. Int. 159, 2004, p. 607-621.

Shaw et al. "Experimental investigations of electromagnetic wave propagation in seawater", European Microwave Conference, Manchester (UK), 2006, p. 572-575.

Smith G. "Loop Antennas", Antenna Engineering Handbook, John L. Volakis ed. Fourth edition, McGraw-Hill, 2007, Chapter 5, p. 5_1-5_25.

Smolyaninov et al. "Surface Wave Based Underwater Radio Communication", IEEE Antennas and Wireless Propagation Letters, vol. 17, Issue: 12, 2018, p. 2503-2507.

Smolyaninov et al. "Development of Broadband Underwater Radio Communication for Application in Unmanned Underwater Vehicles", Journal of Marine Science and Engineering 8, 2020, p. 370 (10 pages).

Smolyaninov et al. "Optical control of photon tunneling through an array of nanometer scale cylindrical channels," Physical Review B, vol. 66, 2002, p. 205414 (5 pages).

Smolyaninov et al. "Imaging of surface plasmon scattering by lithographically created individual surface defects," Physical Review Letters, vol. 77, 1996, p. 3877-3880.

Smolyaninov et al. "Experimental study of surface plasmon scattering by individual surface defects." Physical Review B, 1997, 56, p. 1601-1611.

Smolyaninov et al. "Plasmon-polaritons on the surface of a pseudosphere", Physical Review B 72, 2005, p. 165412 (5 pages).

Smolyaninova et al. "Self-assembled tunable photonic hyper-crystals", Scientific Reports 4, 2014, p. 5706 (9 pages).

Tyler et al. "Electrical conductivity of the global ocean", Earth, Planets and Space 69, 2017, p. 156-166.

Viti, L et al. "Black phosphorus nanodevices at terahertz frequencies: Photodetectors and future challenges," APL Materials, vol. 5, 2017, p. 035602 (11 pages).

Volakis et al. Antenna Theory Analysis and Design, John Wiley & Sons, Third Edition, 2005, p. 231-281.

Wang et al. "Black phosphorus radio-frequency transistors," Nano Letters, vol. 14, 2014, p. 6424-6429.

Zayats A. V. et al. "Nano-optics of surface plasmon-polaritons," Physics Reports, vol. 408, 2005, p. 131-314.

(56) References Cited

OTHER PUBLICATIONS

Zheng et al. "Analytical solution for band-gap structures in photonic crystal with sinusoidal period", Physics Letters A 321, 2004, p. 120-126.

"On the ionospheric conductivity", 3 pages, published online on Feb. 22, 2010 according to Wayback Machine, Retrieved online, 2021 via: http://wdc.kugi.kyoto-u.ac.jp/ionocond/exp/icexp.html.

* cited by examiner

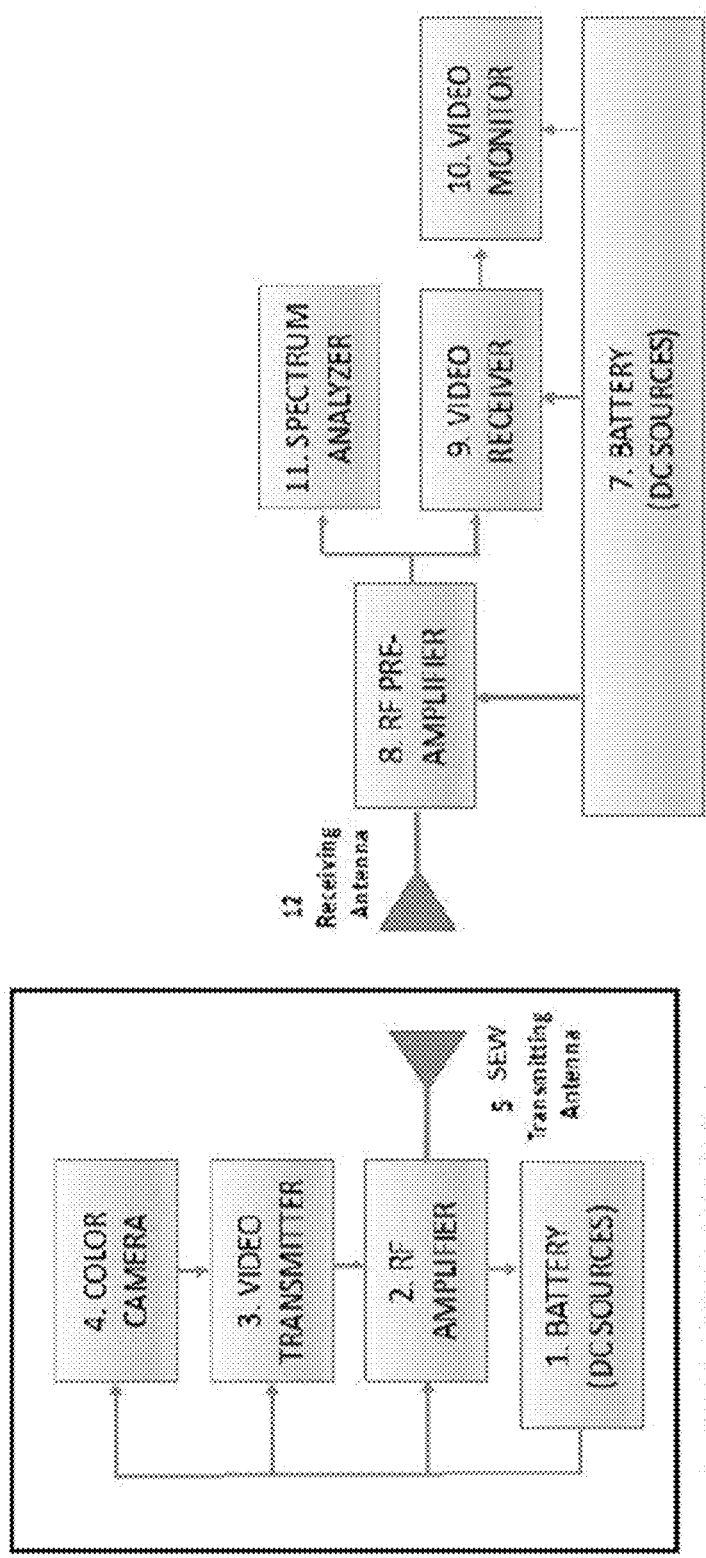

APPARATUS, METHODS AND SYSTEMS FOR IMPROVING COVERAGE OF FIFTH GENERATION (5G) COMMUNICATION NETWORKS

CROSS-REFERENCE TO RELATED APPLICATION

This application claims priority to and the benefits of U.S. Provisional Patent Application No. 63/010,964, filed Apr. 16, 2020, the entire disclosure of which is hereby incorporated by reference in its entirety.

TECHNICAL FIELD

Some embodiments described herein relate generally to communication systems. In particular, but not by way of limitation, some embodiments described herein relate to apparatus, methods, and systems for improving coverage of fifth generation (5G) communication networks.

BACKGROUND

Fifth generation (5G) communication networks are expected to provide greater bandwidth and higher speeds than the existing fourth generation (4G) technologies partly by using higher frequency electromagnetic waves. For example, the 5G communication networks can operate on a mid-frequency band of, for example, 2.5 GHz-3.7 GHz, or a high frequency band of, for example, 25 GHz-39 GHz. These high-frequency electromagnetic waves, however, are often not capable of transmitting through typical obscurations (e.g., buildings, vehicles, etc.) without the strength of the signals being severely compromised. Computing devices (such as cell phones or laptops) near or inside these structures often experience greater latency or inconsistent connections to the 5G networks.

Accordingly, a need exists to improve the coverage of the 5G communication networks, especially near or inside structures.

SUMMARY

In some embodiments, a system includes a first antenna element configured, in response to receiving fifth generation (5G) communication signals carrying encoded data, to generate a first surface electromagnetic wave. The first surface electromagnetic wave is capable of tunneling through a conductive enclosure and includes the encoded data. The system includes a second antenna element, within the conductive enclosure configured, in response to receiving the first surface electromagnetic wave, to generate a second surface electromagnetic wave within the conductive enclosure for distributing the encoded data to an electronic device operating in the conductive enclosure.

BRIEF DESCRIPTION OF THE FIGURES

FIGS. 8a-8b show example transmitting and receiving components of the SEW-based video transmission apparatus, respectively, in some embodiments.

DETAILED DESCRIPTION

Embodiments described herein include apparatus, methods and systems for improving coverage of fifth generation (5G) communication networks, and in particular apparatus, methods and systems for using plasmonic antenna surface waves (or surface electromagnetic waves (SEW)) to distribute 5G network signals over large distances while mitigating or overcoming obstructions to the propagation of the 5G signals caused by objects, conductive enclosures and structures such as buildings, vehicles, trees, people, and/or the like.

In some embodiments, the term "5G" refers to the fifth generation communication technology for digital cellular networks, and 5G signals include electromagnetic radio signals having frequency in the range from, for example, about 300 MHZ (corresponding to about 1 m wavelength) to, for example, about 300 GHz (corresponding to about 1 mm wavelength). For example, 5G signals can be electromagnetic waves having frequency ranging from about 300 MHz to about 1 GHz, from about 1 GHz to about 6 GHz, from about 2.4 GHz to about 4.2 GHz, from about 6 GHz to about 24 GHz, from about 24 GHz to about 72 GHz, from about 28 GHz to about 39 GHz, including values and subranges therebetween. Electromagnetic signals with these frequency ranges are, however, often not capable of passing through typical obscurations (e.g., people, trees, solid objects and structures such as but not limited to buildings, vehicles, and/or the like). As such, the operation of 5G digital networks, both at the access level where user electronic devices access the 5G networks via base stations, as well as at the backhaul level where the base stations communicate with each other to facilitate the access of the electronic devices to the 5G networks, can be impeded or severely compromised near and inside structures.

In some embodiments, a system includes a first antenna element configured, in response to receiving fifth generation (5G) communication signals carrying encoded data, to generate a first surface electromagnetic wave. The first surface electromagnetic wave is capable of tunneling through a conductive enclosure and includes the encoded data. The system includes a second antenna element, within the conductive enclosure configured, in response to receiving the first surface electromagnetic wave, to generate a second surface electromagnetic wave within the conductive enclosure for distributing the encoded data to an electronic device operating in the conductive enclosure.

The term "about" as used herein in connection with a referenced numeric indication means the referenced numeric indication plus or minus up to 10% of that referenced numeric indication. For example, the language "about 50" units covers the range of 45 units to 55 units.

Figure 1:
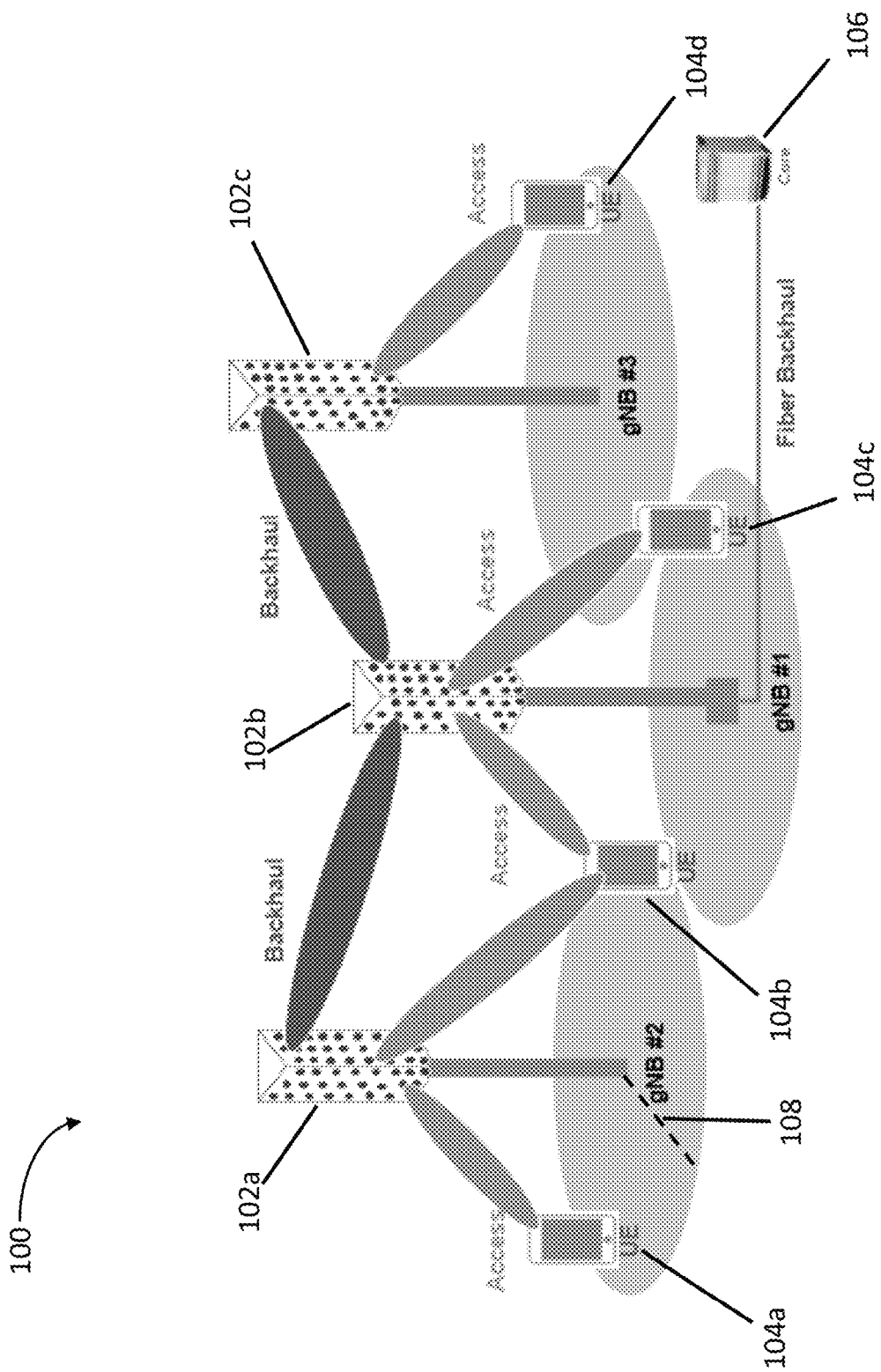
FIG. 1 illustrates an example schematic of a 5G communication network, in some embodiments.

FIG. 1 illustrates an example schematic of a 5G communication network, in some embodiments. In some embodiments, the 5G communication network 100 (or 5G networks) can be a broadband cellular network, which provide connectivity to user electronic devices or user equipment (UE) 104a-104d. The 5G communication network 100 can be distributed over geographical areas (or "cells"), and each cell can be served by, for example, one or more cell sites (or base stations). The 5G communication network 100 can include multiple 5G base stations 102a-102c (e.g., gNB nodes) providing the user electronic devices or user equipment (UE) 104a-104d access to the 5G networks for transmission of voice, data, and other types of data. In some implementations, the base stations 102a-102c may communicate with each other. When joined together, these base stations 102a-102c can provide wireless 5G coverage over a wide geographic area to the user electronic devices 104a-104d. In some implementations, the user electronic devices 104a-104d can be mobile phones, tablets, laptops, desktops, mobile watches, and/or computing devices.

For example, the base stations 102a-102c may be part of a backhaul network that allows communication between the base stations 102a-102c as well as between the base stations 102a-102c and the core network 106 that broadcasts the 5G signals. In such cases, everyday obscurations such as objects and structures may interfere with the access communications between the user devices 104a-104d and the base stations 102a-102c as well as the backhaul communications amongst the base stations 102a-102c and the communication of the base stations 102a-102c with the core network 106. In other words, the propagation of the 5G signals may be interfered with or impeded by the objects, conductive enclosures and structures.

Embodiments described herein include using a plasmonic antenna (also referred to as an antenna, or an antenna element) configured to generate surface waves (or surface electromagnetic waves (SEW)) to overcome or reduce the interference to allow the 5G signals to be transmitted through the obstructions. For example, the structures (or conductive enclosures, objects) can be, for example, buildings (e.g., warehouses), vehicles, planes, underwater vehicles, submarines, ships, having metallic framework or parts, and/or the like. In some implementations, the plasmonic antenna can be used to transmit the 5G signals through these structures. In some implementations, the metallic components of the structure such as metallic rails of buildings, chassis of vehicles, planes, and/or the like, can serve as waveguides that guide the SEWs throughout the structure and distribute the 5G signals over distances larger than the standard propagation range of 5G signals in the same medium (e.g., air).

In some implementations, the plasmonic antenna can be a 2.4 GHz band surface wave antenna. In some implementations, the plasmonic antenna is configured to operate in a frequency range of any of the above-listed 5G signal frequency ranges, such as frequency ranges from about 300 MHz to about 1 GHz, from about 1 GHz to about 6 GHz, from about 2.4 GHz to about 4.2 GHz, from about 6 GHz to about 24 GHz, from about 24 GHz to about 72 GHz, about 28 GHz, about 39 GHz, including values and subranges therebetween. The antenna operation can be based on the strong field enhancement at the antenna tip, which may result in efficient excitation of surface waves propagating along nearby metal or highly conductive surfaces. Such surface electromagnetic waves, i.e., the generated plasmonic antenna surface waves, may efficiently tunnel through deep subwavelength channels from inner to outer metal/dielectric interface of a metal enclosure, thereby allowing broadband radio communication through various metal enclosures and Faraday cages. As such, as discussed above, plasmonic antennas can be used to overcome structures such as buildings, vehicles, people, trees, etc., that obstruct 5G signals to distribute the 5G signals throughout the structures using metallic components of the structure as waveguides.

Figure 2:
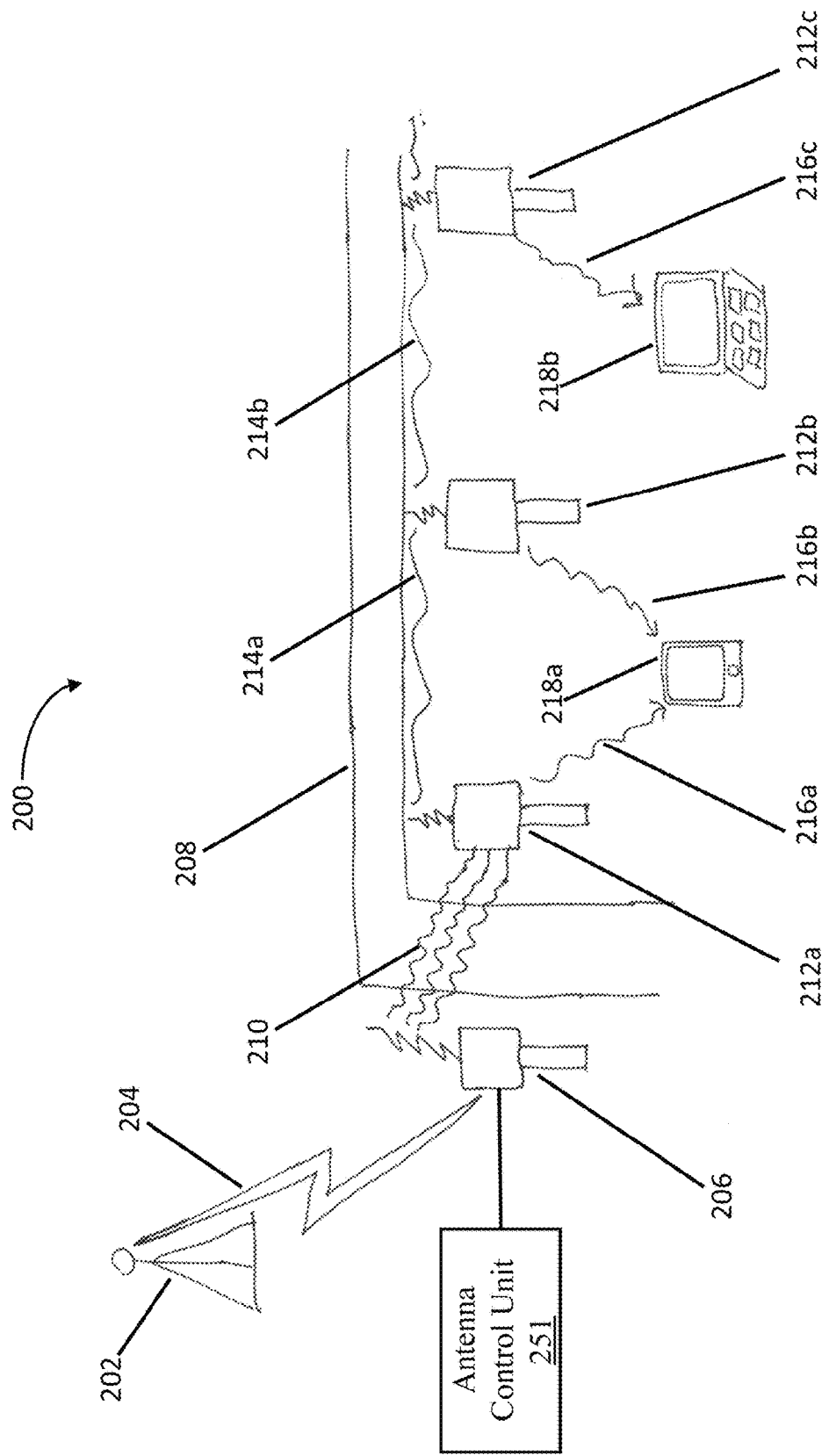
FIG. 2 is an example schematic illustrating the system using plasmonic antenna(s) to improve coverage of the 5G networks near and within a conductive enclosure, in some embodiments.

FIG. 2 is an example schematic illustrating the system using plasmonic antenna(s) to improve coverage of the 5G networks near and within a conductive enclosure, in some embodiments. In some embodiments, the system includes a plasmonic antenna 206 (one or more plasmonic antennas) configured to be disposed near a conductive enclosure 208 and a set of plasmonic antennas 212a-212c configured to be disposed within the conductive enclosure 208. The system can overcome 5G signal obstructions caused by the conductive enclosure 208 and distribute the 5G signals throughout the conductive enclosure 208 using, in some implementations, metallic rails of the structures as waveguides. In some implementations, a base station 202 may receive 5G communication signals from a core network (not shown) for transmission to user devices 218a-218b that are located near or within a conductive enclosure 208. The base station 202 can be physically or functionally similar to the base stations 102a-102c described with regards to FIG. 1. The user devices 218a-218b can be physically or functionally similar to the base stations 102a-102c described with regards to FIG. 1. For example, the user electronic devices 218a-218b can be mobile phones, tablets, laptops, desktops, mobile watches, and/or computing devices. In some implementations, the user devices may also include intermediate devices such as routers, network devices, and/or the like, that are configured to transmit the 5G signals to other user devices.

The conductive enclosure 208 may hinder or interfere with the propagation of the 5G signals 204 to the user devices 218a-218b as in some situations, radio waves in the frequency ranges of 5G signals cannot penetrate or travel through conductive objects (or metallic objects). In some implementations, the conductive enclosure 208 can be a structure or an object that is made from or incorporates conductive or metallic components, examples of which include buildings with metallic components (e.g., metallic warehouse, buildings with suspended ceilings supported with metallic (e.g., aluminum) rails and/or metallic window frames), vehicles, planes, trains, underwater vehicles, submarines, ships, and/or the like. In some implementations, the conductive enclosure 208 can include a surface (e.g., a ceiling or wall surfaces of a structure) with a first dielectric constant and an area surround by the surface having a second dielectric constant. In some cases, the dielectric constant of the area inside can be lower than the dielectric constant of the surface, thus creating an interface that has different dielectric constants on each side of the interface. For example, the conductive enclosure 208 can have a ceiling that is supported with metallic rails (i.e., conductive surface) and the conductive enclosure can be filled with air. The dielectric constant of the air is lower than the dielectric constant of the metallic rail.

In some implementations, the base station 202 may transmit the 5G signals 204 to one or more plasmonic antennas 206 located in the vicinity of the conductive enclosure 208. An example design of the plasmonic antenna 205 is described herein with regards to FIGS. 4-10. In some implementations, the one or more plasmonic antennas 206 can be configured to generate surface electromagnetic waves (SEWs) capable of penetrating through conductive enclosures and propagating along conductive surfaces or metal-dielectric interfaces. In some implementations, the one or more plasmonic antennas 206 may be configured such that, in response to receiving the 5G communication signals 204 (carrying encoded data), the one or more plasmonic antennas 206 (e.g., the apex of the one or more plasmonic antennas 206) that are in close proximity to the conductive enclosure 208 may generate an electromagnetic field that can induce surface electromagnetic waves 210 that include the 5G signals 204 (or include the entire or at least a portion of data encoded by the 5G signals 204, i.e., encoded data) at the surface of the conductive enclosure 208. In some implementations, the one or more plasmonic antennas 206 can, in response to receiving the 5G communication signals 204 (carrying encoded data), generate a first SEW that can tunnels through the conductive enclosure 208. The SEWs 210 generated (or induced) by the plasmonic antennas 206 can tunnel through, for example, metallic objects, and as such, the surface electromagnetic waves 210 can propagate through the conductive enclosure 208 to arrive at a plasmonic antenna 212a located in the interior of the conductive enclosure 208. For instance, surface electromagnetic waves 210 including the 5G signals 204 (or including data encoded by the 5G signals 204) can tunnel through metallic objects having thickness ranging from about 0.1 mm to about 10 cm, from about 1 mm to about 1 cm, from about 10 mm to about 0.1 cm, including values and subranges therebetween.

Upon receiving the surface electromagnetic waves 210, in some implementations, the plasmonic antenna 212a may transmit surface electromagnetic waves 216a (including the encoded data carried by the 5G signals 204) to a user device 218a. In some implementations, the plasmonic antenna 212a may induce or excite a surface electromagnetic wave 214a at the interior surface of the conductive enclosure 208 (i.e., at the interface between the interior surface of the conductive enclosure 208 and the surrounding dielectric materials (e.g., air)). The surface electromagnetic wave 214a can propagate along the interior surface of the conductive enclosure 208 for a distance that can be, for example, larger than the range of 5G signals propagating through the same medium (e.g., air). For example, the surface electromagnetic waves 214a (induced/generated/excited by the first plasmonic antenna 212a) can propagate along the interior surface of the conductive enclosure 208 and arrive at a second plasmonic antenna 212b that is located at a distance from the first plasmonic antenna 212a. In such cases, the distance between the first plasmonic antenna 212a and the second plasmonic antenna 212b can be larger than the standard propagation range of 5G signals in the same medium (e.g., air). For instance, with reference to FIG. 1, the base station 102a may have an associated cell (with a radius equal to the propagation range 108) in the vicinity of the base station 102a within which devices capable of accessing 5G signals transmitted by the base station 102a can access the transmitted signals. In this example, the base station 102a can also be any other antenna capable of transmitting 5G signals including but not limited to the plasmonic antenna 212a. In such cases, the distance (i.e., the distance which the surface electromagnetic waves 214a can propagate along the interior surface of the conductive enclosure 208) may be equal to or greater than the propagation range of 5G signals transmitted by the plasmonic antenna 212a towards the second plasmonic antenna 212b through, for example, air. Stated similarly, the system 200, using a plasmonic antenna 212a to induce or excite surface electromagnetic waves 214a on a surface of a conductive enclosure 208 provides a broader coverage of 5G signals 204 than a system transmitting signals merely through air.

In some implementations, upon receiving the surface electromagnetic waves 214a that include the 5G signals 204 (or include data encoded by the 5G signals 204), the second plasmonic antenna 212b located about a distance away from the first plasmonic antenna 212a may induce or excite surface electromagnetic waves 214b (that also include the 5G signals 204 or data encoded by the 5G signals 204) for transmission to additional plasmonic antennas 212c or user devices 218b (e.g., either directly or through the additional plasmonic antennas 212c). In some implementations, the distance can be in the range from about 1 m to about 10 km, from about 10 ms to about 1000 m, from about 100 m to about 500 m, including values and subranges therebetween. In some implementations, in response to receiving the SEWs 214a, the second plasmonic antenna 212b may transmit SEWs 216b (including the entire or a portion of the data encoded by the 5G signals 204) to the user device 218a. Similarly, upon receiving the SEWs 214b, the third plasmonic antenna 212c may excite/induce/generate SEWs that can propagate along the interior surface of conductive enclosure 208 and transmit SEWs 216c to a user device 218b.

In some implementations, the plasmonic antennas may be positioned in open space along a conductive rail (not shown in FIG. 2), such as but not limited to guardrails along highways. In some implementations, the base station may transmit 5G signals to a first plasmonic antenna that is located on or in the vicinity of a conductive rail such as a guardrail along a highway. In response to receiving the 5G signals, the first plasmonic antenna (e.g., the apex of the plasmonic antenna that is in close proximity to the conductive rail) may generate an electromagnetic field that excites/induces/generates surface electromagnetic waves that include the 5G signals (or include same or at least similar data encoded by the 5G signals) at the surface of the conductive rail. These surface electromagnetic waves may then be transmitted by the first plasmonic antenna to user devices in the vicinity (e.g., user devices including smartphones, laptops, smart watches, etc. located in vehicles or with users traveling along the highway). In some implementations, the first plasmonic antenna may transmit the surface electromagnetic waves or 5G signals to a second plasmonic antenna located on or in the vicinity of the conducive rail about the distance from the first plasmonic antenna.

In some implementations, the plasmonic antennas 212a-212c can be components separate from the user devices 218a-218b. In some implementations, the plasmonic antennas 212a-212c can be components within (or located inside) the user devices 218a-218b. For example, in some implementations, the base station 202 may transmit the 5G signals 204 to one or more plasmonic antennas 206 that are located in the vicinity of the conductive enclosure 208. The one or more plasmonic antennas 206 can be configured to induce surface electromagnetic waves 210 that tunnel through the conductive enclosure 208. The SEWs 210 can include the 5G signals 204 (or include the entire or at least a portion of data encoded by the 5G signals 204, i.e., encoded data). The SEWs 210 (including the encoded data) can be received by a plasmonic antenna located in the user device 218a. The user device 218a may or may not generate SEWs (e.g., 214a) that can be transmitted to other user devices in the conductive enclosure 208.

In some implementations, the one or more plasmonic antennas 206 can be operatively or communicatively coupled to an antenna control unit 251. The antenna control unit 251 are described in detail with regards to FIG. 3. The antenna control unit 251 can be configured to adjust one or more parameters (e.g., frequency, phase, amplitude, distance from the conductive enclosure 208, location, and/or the like) of the plasmonic antenna 206. Similarly, the plasmonic antennas 212a-212c can be operatively or communicatively coupled to an antenna control unit (not shown in FIG. 2) The antenna control unit can be physically and functionally similarly to the antenna control unit 251 described with regards to FIG. 3. The antenna control unit can be configured to adjust/tune one or more parameters (e.g., frequency, phase, amplitude, distance from the conductive enclosure 208, location, distance from user devices 218a-218b, distance from the neighboring plasmonic antenna, and/or the like) of the plasmonic antennas 212a-212c.

Embodiments described herein include a system having a first antenna element (e.g., the plasmonic antenna 206) and a second antenna element (e.g., the plasmonic antenna 212a). The first antenna element can be configured, in response to receiving fifth generation (5G) communication signals 204 carrying encoded data, to generate a first surface electromagnetic wave 210 that tunnels through a conductive enclosure 208. The first surface electromagnetic wave includes/carries the encoded data. The second antenna element 212b is configured to be disposed within the conductive enclosure 208 and, in response to receiving the first surface electromagnetic wave 210, generate a second surface electromagnetic wave 216a within the conductive enclosure 208 for distributing the encoded data to an electronic device 218a operating in the conductive enclosure 208. In some implementations, the system includes one or more antenna control units configured to control generation of the first surface electromagnetic wave 210 and/or generation of the second surface electromagnetic wave 216a. In some implementations, the conductive enclosure 208 is a building with suspended ceilings supported by metallic rails, and the second surface electromagnetic wave 214a propagates along the metallic rails to arrive at the neighboring third antenna element 212b.

Figure 3:
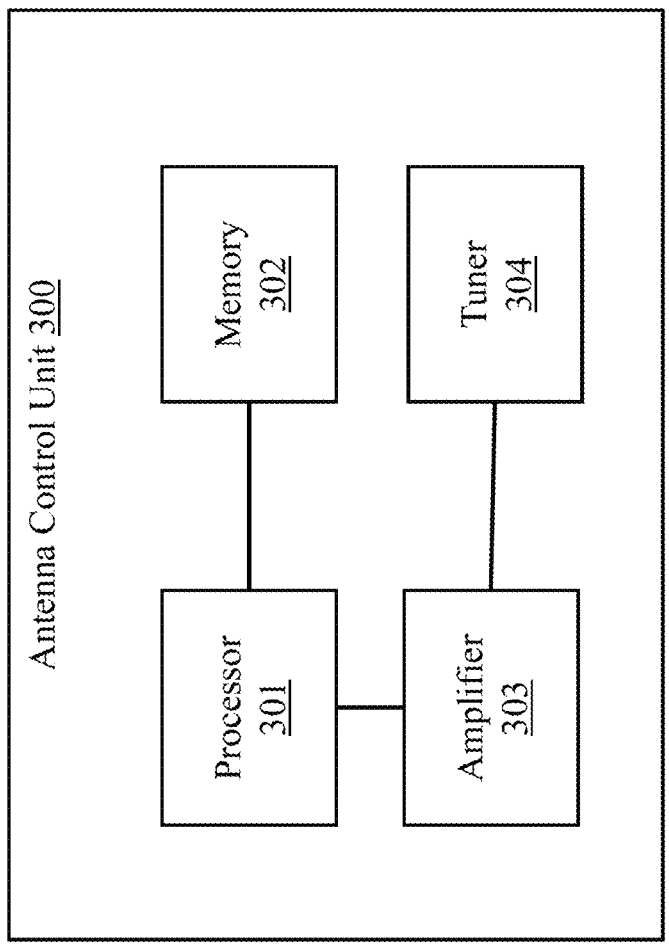
FIG. 3 illustrates an example schematic of an antenna control unit, in some embodiments.

FIG. 3 illustrates an example schematic of an antenna control unit, in some embodiments. In some embodiments, the antenna control unit can include a processor 301, a memory 302, an amplifier 303, and a tuner 304. The memory 302 can be, for example, a random-access memory (RAM) (e.g., a dynamic RAM, a static RAM), a flash memory, a removable memory, a hard drive, a database and/or so forth. In some implementations, the memory 302 can include (or store), for example, a database, process, application, virtual machine, and/or other software modules (stored and/or executing in hardware) and/or hardware modules configured to adjust/tune one or more plasmonic antennas to improve performance and/or coverage of 5G communication signals. In such implementations, instructions for adjusting/tuning one or more plasmonic antennas and/or the associated methods can be stored within the memory 302 and executed at the processor 301 or the tuner 304.

The processor 301 can be configured to, for example, write data into and read data from the memory 302, and execute the instructions stored within the memory 302. The processor 301 can also be configured to execute and/or control, for example, the operations of other components of the antenna control unit 300 (such as the amplifier 303, the tuner 304, a network interface card, other peripheral processing components (not shown)). In some implementations, based on the instructions stored within the memory 302, the processor 301 can be configured to adjust/tune one or more plasmonic antennas to improve performance and/or coverage of 5G communication signals.

The amplifier 303 can be an electrical circuit (or a separate piece of electronic device) that increases the strength of signals generated or received by a plasmonic antenna. The tuner 304 can be configured to adjust/tune one or more parameters (e.g., frequency, phase, amplitude, distance from the conductive enclosure 208, location, distance from user devices 218a-218b, distance from the neighboring plasmonic antenna, and/or the like) of one or more plasmonic antennas.

Example Antenna Design

Figure 4:
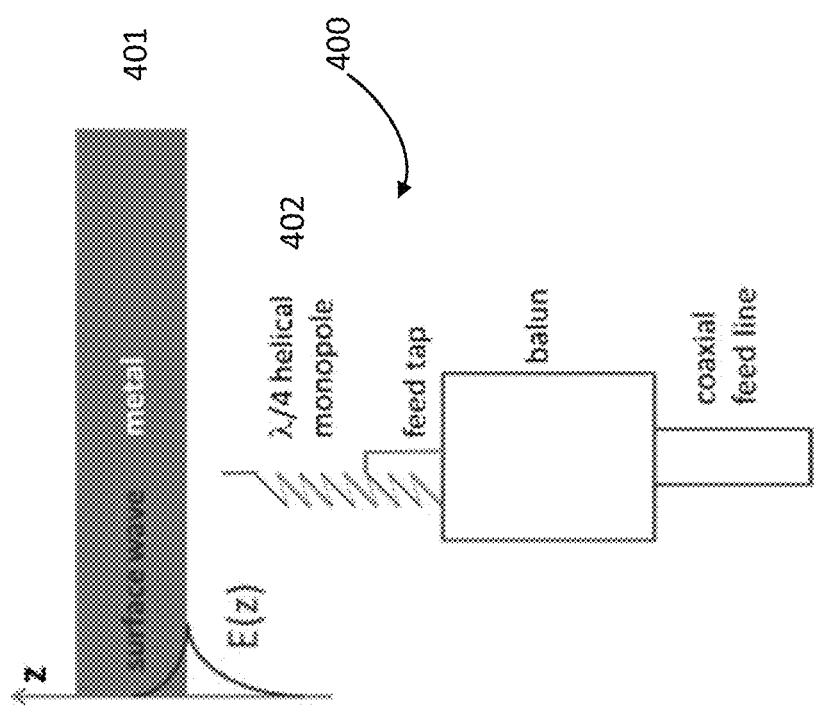
FIG. 4 shows an example design of a plasmonic antenna, in some embodiments.

FIG. 4 shows an example design of a plasmonic antenna (e.g., plasmonic antennas 206, 212a-212c described with regards to FIG. 2), in some embodiments. The plasmonic antenna (also referred to as a surface wave antenna) 400 can operate in, for example, the 2.4 GHz band and be efficient for launching surface electromagnetic waves at metal/dielectric interfaces. The antenna operation can be based on the strong field enhancement at the antenna tip, which results in efficient excitation of surface electromagnetic waves propagating along nearby metal surfaces. Since surface electromagnetic waves may efficiently tunnel through deep subwavelength channels from inner to outer metal/dielectric interface of a metal enclosure, the plasmonic antenna 400 can be used in broadband radio communication (e.g., 5G communication networks) through various conductive enclosures, such as typical commercial Faraday cages.

In some situations, broadband radio signals are compromised for communication through conductive enclosures, such as underground tunnels, metal or partially metallic shipping containers, and metallic test chambers. Performance of conventional RF communication schemes in such situations can be limited by very small RF skin depth δ, which may be calculated as:

$$\delta = \sqrt{\frac{1}{\pi \mu_0 \sigma \nu}}, \quad (1)$$

where $\sigma$ is the medium conductivity, and $\nu$ is the communication frequency. By the Bethe's expression for the transmission of a conventional TEM wave through a subwavelength aperture $$T \propto \left(\frac{a}{\lambda}\right)^4, \quad (2)$$

where a is the aperture size, and $\lambda$ is the free space wavelength. As a result, known techniques of RF communication can be impractical in situations where the walls of an enclosure are highly conductive, and the openings in the walls (if any) have deep subwavelength dimensions.

In some implementations, surface electromagnetic waves (such as surface plasmon-polaritons at metal/dielectric interfaces) can provide efficient light transmission through deep subwavelength apertures. In some implementations, five to six orders of magnitude transmission enhancement can be observed in these experiments. The example design of a plasmonic antenna 400 includes a battery-powered 2.45-GHz transmitting surface wave antenna, which is capable of sending video signals from inside a locked −90 dB isolation commercial Faraday cage. The plasmonic antenna 400 can be used for improving Wi-Fi connectivity in, for example, buildings and underground tunnels, as well as remote examination of metal and partially metal enclosures, such as shipping containers and metallic test chambers, seawater over distances.

As shown in FIG. 4, an example geometry of a 2.4 GHz surface wave antenna design can include a helical monopole shorted to its feed line outer conductor. The tip of the antenna is shown near (in vicinity of) a flat metal surface where it excites an omnidirectional surface electromagnetic wave. The electromagnetic field of the surface electromagnetic wave can be partially longitudinal. An efficient surface wave antenna needs a strong field enhancement at its apex, which "pushes" charges along the metal surface. A large charge accumulation at the tip is achieved using a low driving point impedance antenna. The antenna tip can be also sharpened in order to take advantage of the lightning rod effect.

In some implementations, a SEW solution of Maxwell equations arises when the real part of the dielectric permittivity ε changes sign across the interface. This SEW propagating solution is partially longitudinal. It has a non-zero component of E field along the propagation direction. A dielectric constant of a good metal is:

$$\epsilon_m(\omega) = 1 - \frac{\omega_p^2}{\omega^2 + i\omega\Gamma}, \quad (3)$$

where $\omega_p$ is the plasma frequency, and $\Gamma$ is the damping factor. The real part of $\epsilon_m(\omega)$ is $$\text{Re } \epsilon_m(\omega) = 1 - \frac{\omega_p^2}{\omega^2 + \Gamma^2}. \quad (4)$$

At low frequencies $$\text{Re } \epsilon_m(\omega) \approx 1 - \frac{\omega_p^2}{\Gamma^2}, \quad (5)$$

Thus, the real part of ε of typical metals can be large and negative, while air has ε=1. Therefore, air-metal interfaces can support the SEW modes.

Figure 5:
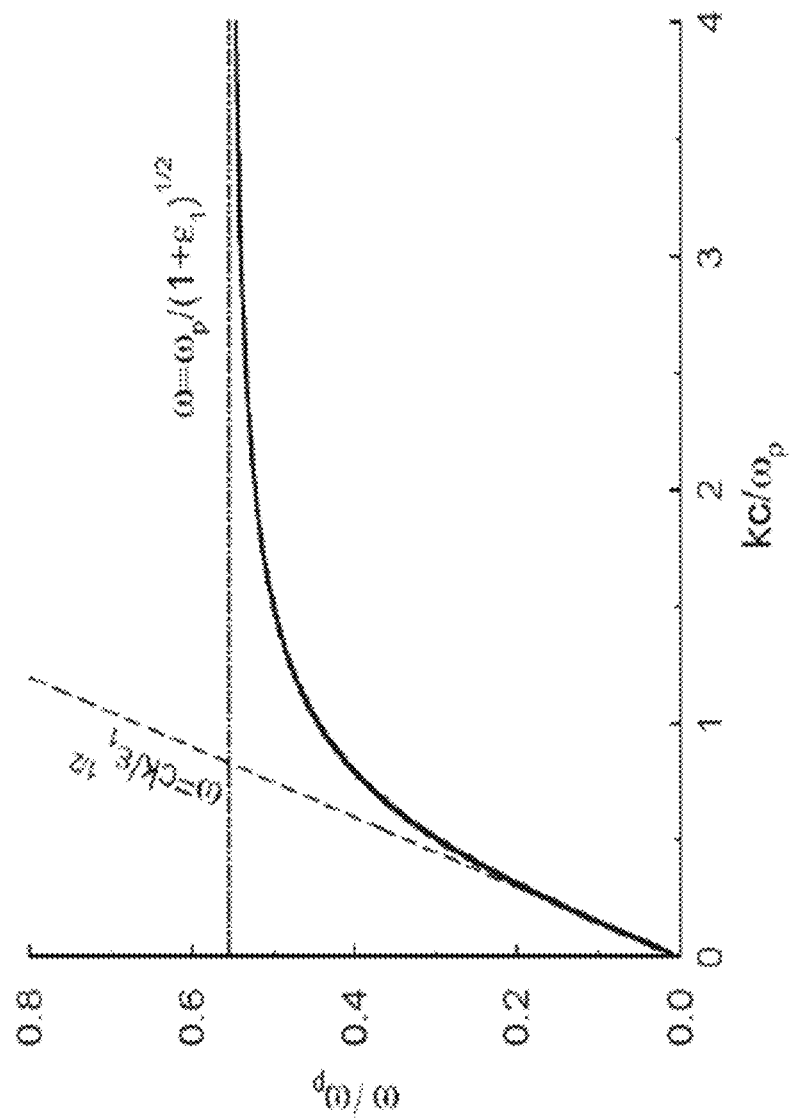
FIG. 5 illustrates the dispersion of a surface electromagnetic wave (SEW) at a metal-dielectric interface, in some embodiments.

FIG. 5 illustrates the dispersion of a surface electromagnetic wave (SEW) at a metal-dielectric interface, in some embodiments. In some embodiments, the SEW momentum is larger than the momentum of conventional TEM wave at the same frequency (k=2π/$\lambda_{SEW}$ is the SEW wave vector, c is the speed of light, and $\epsilon_1$ is the dielectric permittivity of the dielectric medium). Therefore, a plane TEM wave incident on a flat metal-dielectric interface cannot excite SEW due to momentum conservation. However, as illustrated in FIG. 4, the metal surface 401 which supports SEW propagation is placed within the near-field region of the antenna 400. The plasmonic antenna can be optimized for excitation of partially longitudinal waves. The strong field enhancement at the antenna apex "pushes" charges along the metal surface, leading to efficient excitation of SEWs.

In some implementations, the SEWs facilitate transmission of electromagnetic energy through metal wall "imperfections", such as small fissures and gaps, which can be left in metal doors. Since both the internal and external metal surfaces support SEW modes, in these implementations, these two surfaces can act as weakly coupled SEW resonators, which may accumulate electromagnetic energy, and may also facilitate transmission of the electromagnetic energy across gaps between metal walls. While the small fissures and gaps cannot pass the conventional transverse electromagnetic (TEM) fields, SEW penetration is considerably higher in these situations.

In some implementations, sharp peaks in transmission can take place at wavelengths as large as ten times the diameter of the holes. At these maxima, the transmission efficiency can exceed unity (when normalized to the area of the holes), which is orders of magnitude greater than known methods. The physical mechanism of this effect involves coupling of the SEW modes of the inner and outer metal interfaces, so that hybridized symmetric and anti-symmetric SEW modes can be formed, which are strongly coupled to each other. In addition, SEW modes can also exist in deep subwavelength gaps, which also facilitate SEW transmission. As shown in FIG. 5, SEW wavelength $\lambda_{SEW}$ may become much smaller than the wavelength of conventional TEM wave λ in free space.

Returning to FIG. 4, the plasmonic antenna 400 can include a λ/4 helical monopole 402 resonant at, for example, 2.4 GHz, which can be more efficient than a linear short monopole of the same length, since the helical monopole design can considerably enhance the electric field at its tip. In some implementations, the charge at the tip can be proportional to the divergence of the antenna current. A larger charge accumulation at the tip can be achieved using a low driving point impedance antenna, e.g., a helix. The antenna tip can be sharpened in order to use the lightning rod effect, which increases the electric field near the tip, thus leading to enhanced SEW emission. An antenna control unit (e.g., 300 in FIG. 3) can be used to tune the antenna 400 because, for example, the feed can alter the electrical length of the antenna 400.

Figure 6:
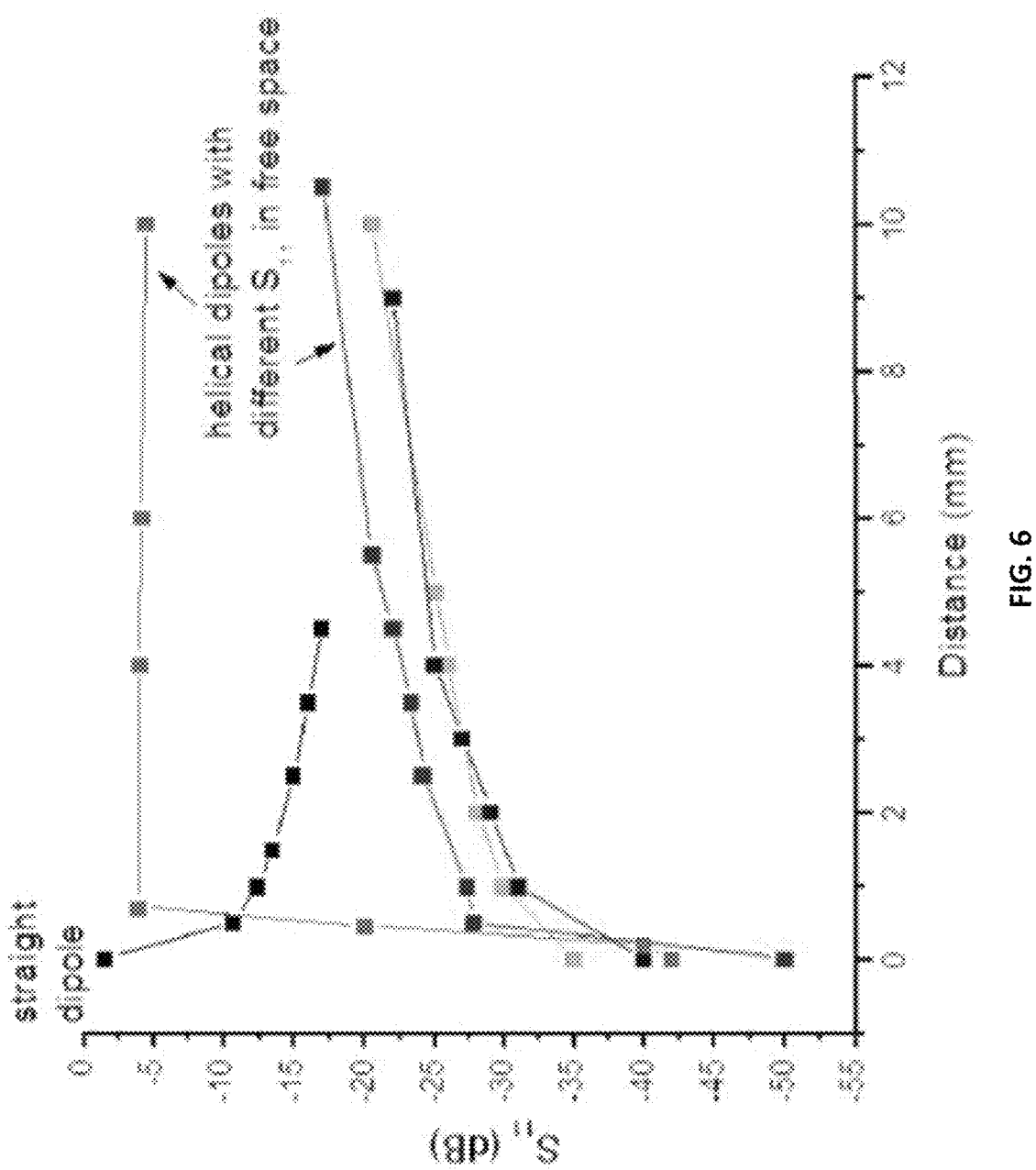
FIG. 6 shows example measurements of $S_{11}$ as a function of distance from the large conductive copper plane of the fabricated helical antennas, in some embodiments.
Figure 7:
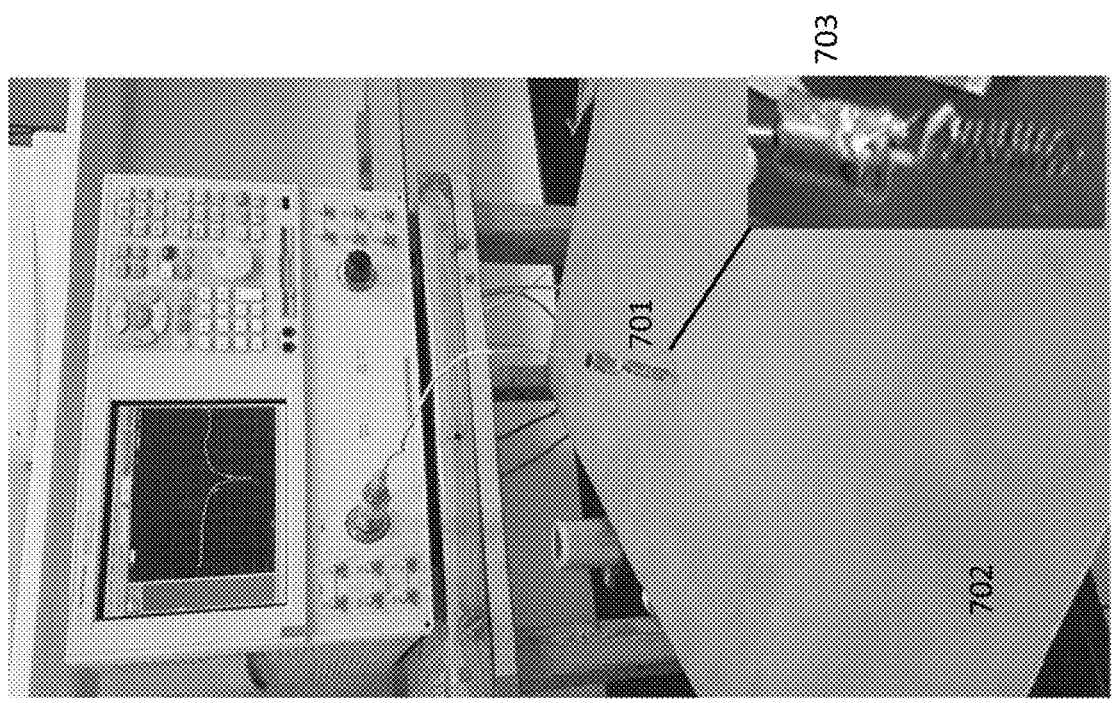
FIG. 7 shows an experimental setup to determine the tapping point for a 50Ω match to a feeding coaxial line, in some embodiments.

FIGS. 6-7 illustrate an example procedure to tune the antenna 400, in some embodiments. FIG. 6 shows example measurements of a scattering parameter $S_{11}$ as a function of distance from the large conductive copper plane of the fabricated helical antennas (701 in FIG. 7) resonant at 2.45 GHz, while they nearly contact the large conductive copper plane (702 in FIG. 7). $S_{11}$ is an element of the scattering parameter matrix for a 2-port network. Scattering parameters describe the electrical behavior of linear electrical network when undergoing various steady state stimuli by electrical signals. An enlarged view of an example plasmonic antenna is shown as 703 in FIG. 7. The length and diameter of the helical antenna were selected for resonance at 2.45 GHz near the conductive plane 702. The helical monopole can be, for example, 3 cm long with 0.7 cm in diameter. FIG. 7 shows an experimental setup to determine the tapping point for a 50Ω match to a feeding coaxial line. Depending on the tapping point location, the radiative behavior of the helical antenna may be optimized for either 2D surface wave radiation or 3D radiation into free space. The tuning of the antenna can be performed (by an antenna control unit) by maximizing the received video signal outside a closed commercial Faraday chamber.

Figure 9C:
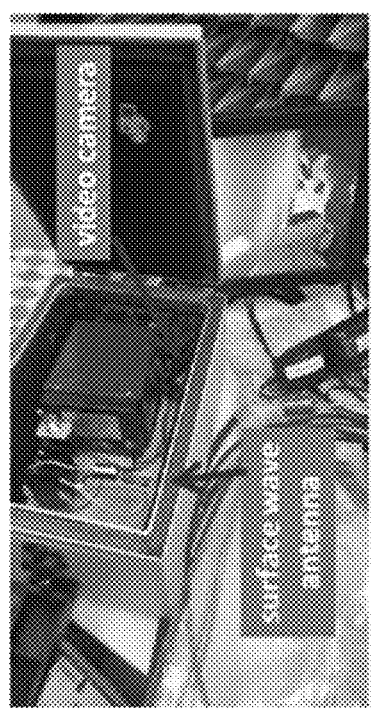
FIGS. 9a-9d show the performance comparison of a conventional dipole antenna and the SEW antenna, in some embodiments.
Figure 9D:
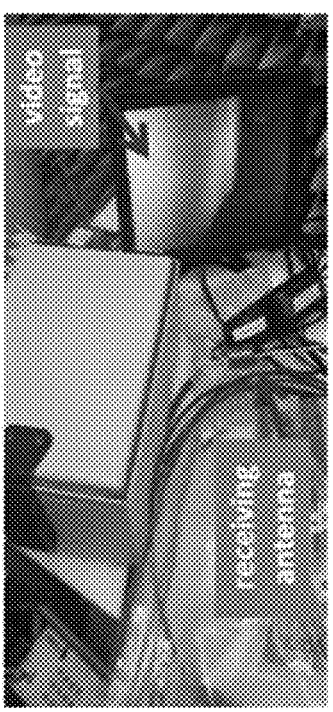
Figure 9A:
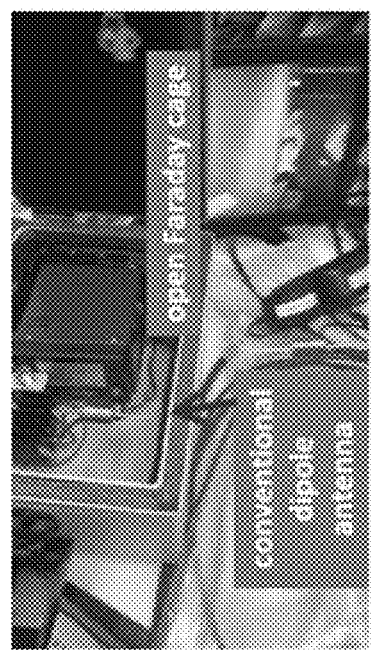
Figure 9B:
Figure 10:
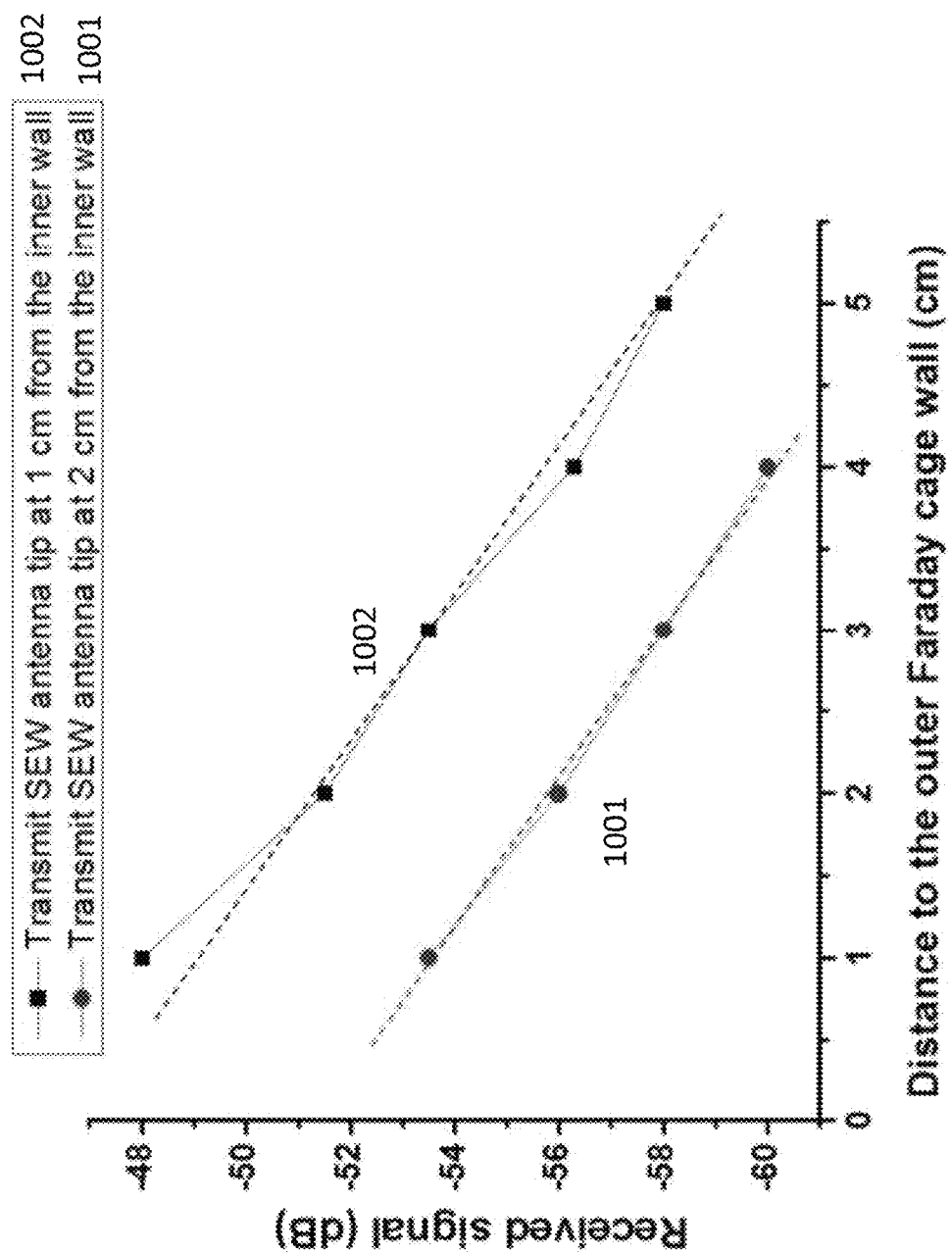
FIG. 10 shows example transmitted signals measured near the Faraday cage as a function of distance from the outside wall of the cage, in some embodiments.

FIGS. 8-10 show example operational performance of the surface wave antenna tested by transmitting Wi-Fi video signals (an example of the encoded data carried by the 5G signals 204 in FIG. 2) through a commercial −90 dB isolation Faraday cage. FIG. 8a shows example transmitting components of the SEW-based video transmission apparatus, in some embodiments. FIG. 8b shows example receiving components of the SEW-based video transmission apparatus, in some embodiments. In some situations, the electromagnetic shielding enclosure (EMI) is rated at −90 dB isolation. Video signals generated from within the locked Faraday cage and transmitted live through free space without any cabling or connecting ground between the transmitter and receiver were received outside the enclosure at distances in the order of 10 to 100 cm and displayed on a live TV monitor. An amplified video signal generated inside the −90 dB isolation Faraday cage was fed via coaxial cable to the SEW transmitting antenna at 2.45 GHz. Outside the Faraday enclosure at a distance in the order of 10 to 100 cm, the video signal was received by either a conventional dipole antenna or a SEW antenna identical to the one of the transmitter. The received video signal was amplified, decoded, and displayed on a live video monitor. In some implementations, the real-time visual output of the receive antenna was also decomposed into signal spectral amplitudes and displayed by a spectrum analyzer.

FIGS. 9a-9d show the performance comparison of a conventional dipole antenna (9a-9b) and the SEW antenna (9c-9d). As shown in FIGS. 9a-9b, the conventional dipole antenna was not able to transmit video signal from inside the locked Faraday cage. The received signal fell below the −92 dBm sensitivity limit of the video receiver circuit and was undetectable (video receiver RF Links, model VRX-24L, which uses NTSC/PAL encoding was used in this experiment). On the other hand, as shown in FIGS. 9c-9d, when the SEW transmit antenna was used inside the locked cage at the same transmit operating power, the live video connection was maintained. The example received signals in this case (of the order of −55 dBm) are shown in FIG. 10.

FIG. 10 shows example transmitted signals measured near the Faraday cage as a function of distance from the outside wall of the cage in the configuration shown in FIGS. 9c-9d. The SEW-mediated mechanism of 2.4 GHz video signal transmission through the locked Faraday cage has been verified by the transmitted signal measurements near the Faraday cage as a function of distance from the outside wall of the cage. The SEW shows exponential decay of the transmitted signal outside of the cage. The signal received farther away from the cage (in the far field zone) can originate from the transmitted SEW field reaching the cage corners and scattering into the conventional propagating TEM fields. In some implementations, the transmitting SEW antenna efficiency can depend on the distance between the antenna tip and the inner wall of the Faraday cage, as shown by curve 1001 in FIG. 8. In both cases, the antenna was tuned for maximum signal outside the Faraday cage.

In some implementations, the imperfection of the Faraday cage used in the experiments is the door. The door can be protected from leakage by a metallic mesh (as shown in FIGS. 9a-9d), which is positioned in between the metallic double walls of the cage. The mesh has periodic millimeter-scale openings. SEWs can penetrate well through these kinds of periodic sub-wavelength defects.

In some implementations, the conductive enclosure (e.g., 208 in FIG. 2) is not connected to ground. In some implementations, grounding the Faraday cage, for example, does not eliminate the video signal transmission from the inner SEW antenna. In some implementations, the SEW field can be partially longitudinal. The SEW field has a nonzero electric field component parallel to the metal walls of the cage. Therefore, grounding the cage at some point(s) does not prevent SEW from propagating along the inner and outer walls of the cage, followed by scattering of the SEW propagating along the outer wall into the conventional TEM modes propagating in free space.

Embodiments described herein include a system having plasmonic antennas generating surface electromagnetic waves that may efficiently tunnel through deep subwavelength channels from inner to outer metal/dielectric interface of a metal enclosure. Embodiments described herein can be used for broadband radio communication (e.g., 5G communication networks) through various metal enclosures and Faraday cages. The system can be scalable to other RF frequency ranges.

Example Use Cases

In some implementations, the system using plasmonic antennas and generating surface electromagnetic waves can be used in, for example, (1) communicating and scanning across a conductive (metal) enclosures/containers/vehicle, including SCIFs (secret workspaces), and down into submarines/ships, (2) scanning across and inside of human body tissues, organs, and/or the like, (3) maritime and port security detection, (4) maritime drug/foe interdiction, (5) communicating across hypersonic plasma layers for space reentry vehicles and warheads, (6) underwater or through/across water communications (using surface of sea and seabed interfaces: including frogmen, UUV-UUV/submerged/surfaced vessels, underwater-surfaced/air vessels, etc. connectivity) with Marine-life safe applicability; and detect, track, classify objects under water (e.g., alternative to SONAR), (7) underwater RADAR scanning (surface of sea and seabed interfaces), (8) aircraft RADAR/Scanning, (9) safer alternative to (also improved performance), for example, RADAR, SONAR/Acoustics, cell phone wireless e.g., 5G, etc., X-ray medical and security (e.g., hospital, airport, "wanding," etc.) imaging/object/metal detection, any technology that uses antennas, (10) alternative navigation at sea, in space, or on land, to GPS satellite, etc., via our communications, (11) submarine/ship launched wireless torpedoes, (12) submarine/ship transmittal and reception of "over-the-horizon" communications (including for Strategic Comms), (13) wireless cellphone service alternative to known cell phone communications methods (e.g., 4G/5G, etc.) including, for example, wireless (e.g., 5G, etc.) communications, across and interacting with the human body, (14) underground penetrating RADAR (including into hardened structures/bunkers or underwater firstly, e.g., oil and gas applications), (15) through wall/bunker/hardened structure RADAR/scanning, (16) the ability to counter-detect any of the above by others.

Figure 11:
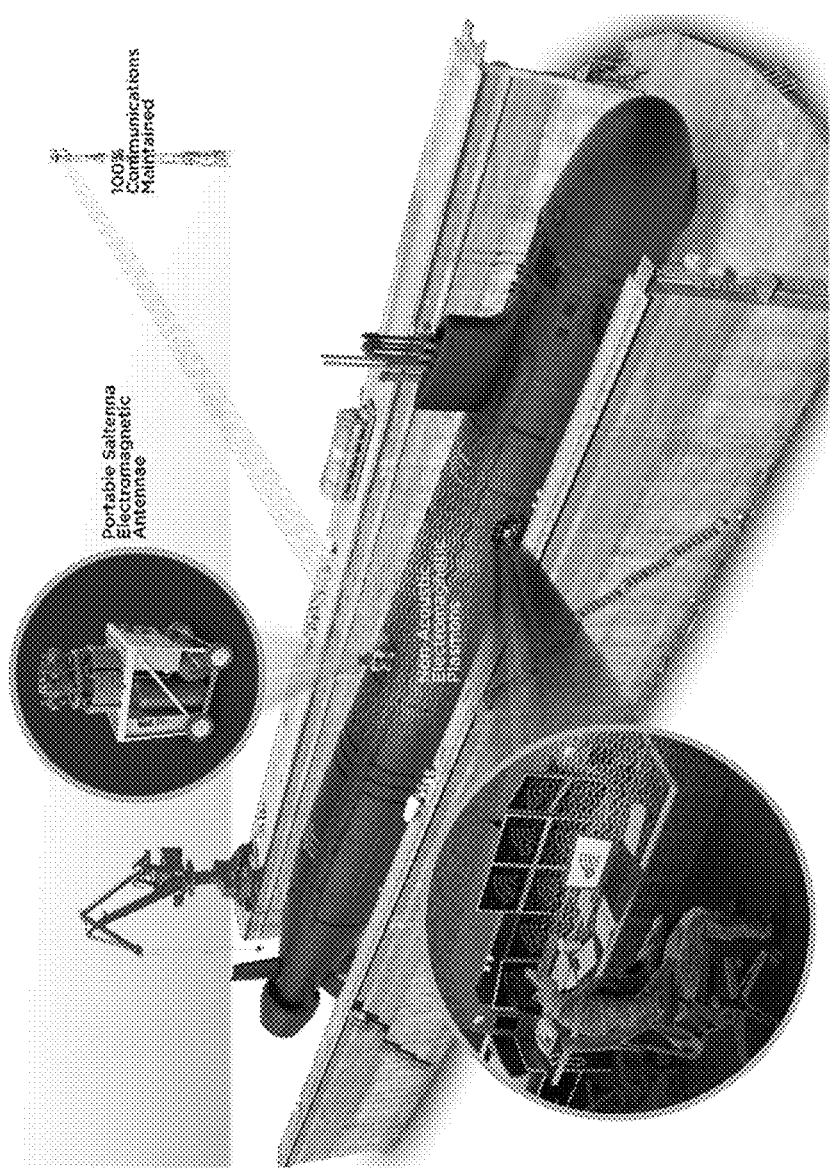
FIG. 11 shows an example use case of using SEWs to improve communications from/to an underwater object, in some embodiments.

FIG. 11 shows an example use case of using SEWs to improve communications from/to an underwater object, in some embodiments. In some embodiments, using the system having plasmonic antennas generating SEWs provides improved broadband voice and data communication across barriers (e.g., submarines, surface vessels, and similar metal enclosures (secure workspaces, containers, etc.)) and over larger distances. The existing and/or additional conductive surfaces on the underwater object can extend transmission of SEWs to enable, for example, remote examination of the interior of the underwater object. The underwater object can include one repeater that covers the floors/buildings. In some instances, the repeater can receive a communication signal and re-transmit it to other receivers located across a desired area.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of the present technology may be implemented using hardware, firmware, software or a combination thereof. When implemented in firmware and/or software, the firmware and/or software code can be executed on any suitable processor or collection of logic components, whether provided in a single device or distributed among multiple devices.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claims is:

1. A system, comprising:
 a first antenna element configured, in response to receiving fifth generation (5G) communication signals carrying encoded data, to generate a first surface electromagnetic wave capable of tunneling through a conductive enclosure, the first surface electromagnetic wave having the encoded data; and
 a second antenna element, within the conductive enclosure configured, in response to receiving the first surface electromagnetic wave, to generate a second surface electromagnetic wave within the conductive enclosure for distributing the encoded data to an electronic device operating in the conductive enclosure, wherein:

the conductive enclosure includes a conductive surface and an area surround by the conductive surface, a dielectric constant of the area is lower than a dielectric constant of the conductive surface.

2. The system of claim 1, wherein the first antenna element is disposed outside of the conductive enclosure.

3. The system of claim 2, wherein the second antenna element is disposed within the conductive enclosure.

4. The system of claim 1, wherein the second antenna element is disposed within the conductive enclosure.

5. The system of claim 1, wherein the second antenna element is configured to generate a third surface electromagnetic wave that propagates along a surface of the conductive enclosure to be received by a neighboring third antenna element, the neighboring third antenna element configured to generate a fourth surface electromagnetic wave such that the electronic device receives the encoded data.

6. The system of claim 1, further comprising an antenna control unit configured to control a parameter associated with the first antenna element.

7. The system of claim 1, further comprising an antenna control unit configured to control a parameter associated with the second antenna element.

8. The system of claim 1, wherein:
the conductive enclosure is a building with suspended ceilings supported by metallic rails; and
the second antenna element is configured to generate a third surface electromagnetic wave capable of propagating along the metallic rails to be received by a neighboring third antenna element.

9. The system of claim 1, wherein the first antenna element comprises a helical monopole.

10. The system of claim 1, wherein the first antenna element comprises a low driving point impedance antenna.

11. The system of claim 1, wherein an electromagnetic field of the first surface electromagnetic wave is partially longitudinal.

12. The system of claim 1, further comprising an antenna control unit configured to tune the first antenna element.

13. The system of claim 1, wherein the conductive enclosure is not connected to ground.

14. The system of claim 1, wherein the conductive enclosure is an underwater vehicle.

15. A system, comprising:
a first antenna element configured to be disposed within a conductive enclosure, the first antenna element configured to receive a first surface electromagnetic wave from a second antenna element disposed outside of the conductive enclosure, the first surface electromagnetic wave carrying data encoded by fifth generation (5G) communication signals, the first antenna element configured to generate, in response to receiving the first surface electromagnetic wave, a second surface electromagnetic wave and a third surface electromagnetic wave, such that an electronic device disposed within the conductive enclosure receives the second surface electromagnetic wave having the data, the third surface electromagnetic wave propagating along a surface of the conductive enclosure; and
a third antenna element configured to be disposed within the conductive enclosure and generate, in response to receiving the third surface electromagnetic wave, a fourth surface electromagnetic wave such that electronic device receives the fourth surface electromagnetic wave.

16. The system of claim 15, further comprising an antenna control unit configured to adjust a distance between the first antenna element and the third antenna element to adjust a strength of the fourth surface electromagnetic wave.

17. The system of claim 15, wherein:
the conductive enclosure is a building with suspended ceilings supported by metallic rails, and
the third surface electromagnetic wave propagates along the metallic rails to be received by the third antenna element.

18. The system of claim 15, wherein the first antenna element comprises a helical monopole.

19. The system of claim 15, wherein the first antenna element comprises a low driving point impedance antenna.

20. A system, comprising:
a first antenna element configured, in response to receiving fifth generation (5G) communication signals carrying encoded data, to generate a surface electromagnetic wave capable of tunneling through a conductive enclosure, the surface electromagnetic wave having the encoded data received by a second antenna element disposed within an electronic device within the conductive enclosure; and
an antenna control unit communicatively coupled to the first antenna element and configured to adjust a parameter associated with the first antenna element to adjust a strength of the surface electromagnetic wave, wherein:
the conductive enclosure includes a conductive surface and an area surround by the conductive surface, a dielectric constant of the area is lower than a dielectric constant of the conductive surface.

* * * * *